US005518317A

United States Patent [19]
Osawa

[11] Patent Number: 5,518,317
[45] Date of Patent: May 21, 1996

[54] MINIATURE LINEAR GUIDE DEVICE AND PROFILE OF SLIDER THEREOF

[75] Inventor: Nobuyuki Osawa, Gunma, Japan

[73] Assignee: NSK Ltd., Tokyo, Japan

[21] Appl. No.: 364,262

[22] Filed: Dec. 27, 1994

[30] Foreign Application Priority Data

Dec. 27, 1993 [JP] Japan ............................... 5-074103 U
Dec. 27, 1993 [JP] Japan ..................................... 5-348345

[51] Int. Cl.$^6$ ..................................................... F16C 29/06
[52] U.S. Cl. .................................................................. 384/45
[58] Field of Search ................................. 384/45, 44, 43, 384/59; 464/168

[56] References Cited

U.S. PATENT DOCUMENTS

| | | | |
|---|---|---|---|
| 4,701,057 | 10/1987 | Kashiwabara | 384/45 |
| 4,778,284 | 10/1988 | Teremachi | 384/45 |
| 4,795,272 | 1/1989 | Mottate | 384/45 |
| 4,798,479 | 1/1989 | Morita | 384/45 |

*Primary Examiner*—Lenard A. Footland
*Attorney, Agent, or Firm*—Sughrue, Mion, Zinn, Macpeak & Seas

[57] ABSTRACT

In a miniature linear guide device providing: an axially extending guide rail U-shaped in section, the guide rail including a load ball rolling groove formed on an inner surface of a side wall of the guide rail, a slider body U-shaped in section which is fitted in the side wall of the guide rail, the slider body including a load ball rolling groove formed on an outer surface of a side wall of the slider body and confronted with the load ball rolling groove of the guide rail; a circulator fitted in the slider body and including a non-load ball circulating path; and a plurality of balls rolling between the load ball rolling grooves and the non-load ball circulating path, the guide rail includes a rail mounting portion formed by cutting a portion of a bottom of the guide rail and bending the portion outward in a width direction so as to be opened apart outward from the side wall. Further, the circulator includes a recess formed in a middle portion of a longitudinal end of the circulator for accommodating a head of a rail mounting screw fixing an end of the guide rail to a base. The rail fastening force can be increased with ease by increasing the size and number of rail mounting screws. The height of the linear guide device can be lowered.

7 Claims, 6 Drawing Sheets

MINIATURE LINEAR GUIDE DEVICE AND PROFILE OF SLIDER THEREOF

BACKGROUND OF THE INVENTION

The present invention relates to miniature linear guide devices adapted for use in comparatively small devices such as computer-related devices, office automation equipment, measuring instruments, drafting equipment, and semiconductor manufacturing systems. More particularly, the present invention is directed to an improved structure for mounting a guide rail thereof and an improved profile of a slider thereof.

Figure 8:
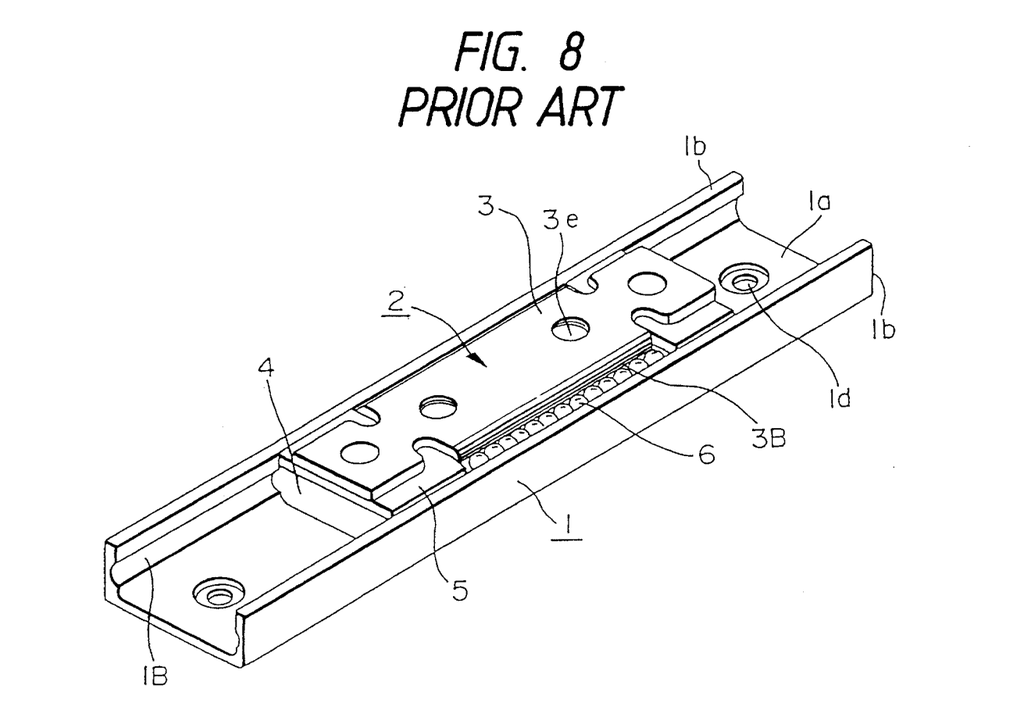
FIG. 8 is a general perspective view of a conventional miniature linear guide device.
Figure 9:
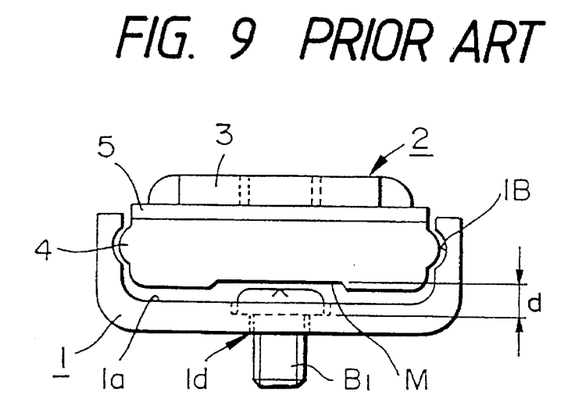
FIG. 9 is a front view of the conventional miniature linear guide device in FIG. 8.
Figure 10:
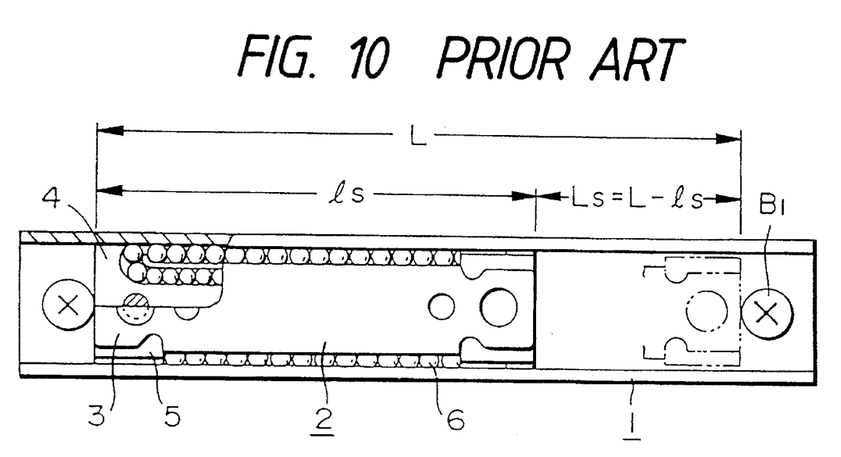
FIG. 10 is a plan view of the conventional miniature linear guide device in FIG. 8.

A conventional miniature linear guide device is for instance as shown in FIGS. 8 to 10. The linear guide device is assembled with a guide rail 1 substantially U-shaped in section which is extended in a longitudinal direction (or axial direction) of the device by press molding a thin steel plate, and a slider 2 slidably mounted on the guide rail 1. The slider 2 provides: a slider body 3 substantially inverse-U-shaped in section which is formed of a thin steel plate by pressing; a circulator 4 which is formed of plastic by molding and has ball circulating paths therein; and a cap 5 which is formed of plastic. The circulator 4 and the cap 5 are fitted in a concave portion of the slider body 3 so that the cap 5 is interposed between the slider body 3 and the circulator 4.

Load ball rolling grooves 1B and 3B are formed in the inner surfaces of both side walls of the guide rail 1 and in the outer surfaces of both side walls of the slider body 3, respectively, in such a manner that those grooves 1B and 3B are extended in an axial direction of the guide device and confronted with each other. A plurality of balls 6 are fitted in the load ball rolling grooves 1B and 3B and in the ball circulating paths in the circulator 4. The balls 6 are infinitely circulated while being rolled so that the slider 2 is linearly moved along the guide rail 1.

As shown in FIG. 9, the guide rail 1 is fixed by inserting screws B1 into mounting holes 1d of a bottom 1a of a rail, and tightening the screws into screw holes of a base. On the other hand, the slider 2 is mounted on other member such as a machine table by screwing screws into mounting screw holes 3e formed in the top of the slider body.

Since the miniature linear guide device is generally used in a small space, it is demanded that the height thereof be as small as possible. Therefore, as shown in FIG. 9, a distance α between the bottom of the guide rail 1 and that of the slider 2 is set to a small value. However, since the guide rail 1 is mounted on the base by causing the head of each screw $B_1$ inserted into the mounting hole 1d of the bottom 1a of the rail to be accommodated in this small gap α in the conventional linear guide device, there has been a limitation on the size of the screw $B_1$ that can be used without interference with the slider 2. It is for this reason that the force for fastening the guider rail with the base cannot be increased by increasing the size of the screw $B_1$ under operating conditions in which vibration and impact are applied. In addition, the guide rail tends to deformation by the screw tightening force applied at the time of mounting the guide rail.

To overcome these conventional problems, it is conceivable to, e.g., increase the thickness of the wall of the guide rail 1 so that the heads of the mounting screws can be embedded completely into deep spot facing holes. However, such a manner entails an increase in height, cost of manufacture, and the like. On the other hand, it is also conceivable to weld mounting plates on the outer surfaces of the side walls of the guide rail. However, such a manner involves a welding process in forming the mounting sections, which not only increases the cost of manufacture, but also causes deterioration in accuracy and the like due to the guide rail being subjected to thermal distortion.

Further, to reduce the height of the linear guide device, not only the mounting holes 1d in the bottom 1a of the guide rail 1 are formed into spot facing holes, but also a shallow recess M in the middle in the axial direction of the bottom of the slider 2 is arranged as shown in FIG. 9, so that the heads of the rail mounting screws $B_1$ can be accommodated in the gap α between the bottom of the guide rail 1 and that of the slider 2 to prevent interference of the screws $B_1$ with the slider 2 while the slider 2 is travelling over the screws $B_1$.

However, in the case where a particularly small height is required, it is sometimes taken such that the slider 2 is stopped before the slider 2 reaches the screws $B_1$ to prevent interference and the thicknesses of the guide rail 1 and the slider 2 are reduced by a value substantially equal to the gap α. In this case, the maximum stroke of movement of the slider 2 is determined by the positions at which the end of the slider 2 interferes with the rail mounting screws $B_1$. Since the end faces of the conventional slider 2 are flat, the effective stroke $L_s$ of the slider 2 is equal to a length $(L-l_s)$ obtained by subtracting the total length $l_s$ of the slider 2 from the distance between the heads of the rail mounting screws $B_1$ mounted on both end portions of the guide rail 1.

By the way, it is often required that the effective stroke be as long as possible while making the height as small as possible. This requirement can be simply met only by increasing the length of the guide rail 1. However, since most miniature linear guide devices are used in extremely small spaces, it is, in reality, difficult to increase the length of the guide rail.

On the other hand, it is also conceivable to decrease the length of the slider 2 instead of increasing the length of the guide rail 1. In this case, the length of each load ball rolling groove 3B is decreased as much as the length of the slider 2 is decreased. As a result, the number of load balls 6 (the effective number of balls) is decreased, which in turn reduces load capacity of the linear guide device.

Moreover, inaccuracy in molding the curved grooves of the conventional circulator due to shrinkage cavity at the time of molding has imposed a problem of the operability of the balls.

SUMMARY OF THE INVENTION

The present invention has been made in consideration of the aforementioned conventional problems. Accordingly, an object of the present invention is to provide inexpensively a miniature linear guide device that can increase the fastening force achieving a small height of the linear guide device, ensure stable accuracy under operating conditions in which vibration and impact are applied, and have a guide rail mounting structure in which accuracy in the profile of the load ball rolling grooves of the guide rail is hard to impair at the time of fixing the guide rail.

Another object of the present invention is to provide a miniature linear guide device that can reduce the height of the linear guide device, increase only the stroke without changing the lengths of the guide rail and the slider, and improve accuracy in molding the curved grooves of the circulator and ensure good operability of the balls.

To achieve the above objects, a first aspect of the present invention is applied to a miniature linear guide device that includes: an axially extending guide rail having a substantially U-shaped in cross section and having axially extending load ball rolling grooves on inner surfaces of side walls thereof, the side walls confronting each other; a slider body having a substantially inverted U-shape in cross section, being fitted between the inner surfaces of the side walls of the guide rail, and having load ball rolling grooves on outer surfaces of side walls thereof, the load ball rolling grooves confronting the load ball rolling groove of the guide rail, respectively; a circulator being fitted into recessed portions of the slider body and having an axially extending non-load ball circulating path therein; and a plurality of balls circulating by rolling in the load ball rolling grooves of the slider body and the guide rail via the non-load circulating path of the circulator. In such miniature linear guide device, rail mounting portions are formed by cutting portions of the guide rail and bending the cut portions outward in a width direction so as to be opened apart outward from the side walls.

To achieve the above objects, a second aspect of the present invention is applied to a miniature linear guide device that includes: an axially extending guide rail having a substantially U-shaped in cross section and having axially extending load ball rolling grooves on inner surfaces of side walls thereof, the side walls confronting each other; a slider body having load ball rolling grooves on outer surfaces of side walls thereof, the load ball rolling grooves confronting the load ball rolling grooves of the guide rail, respectively, and being fitted between the inner surfaces of the side walls of the guide rail with a circulator attached thereinto, the circulator having an axially extending non-load ball circulating path; and a plurality of balls circulating by rolling in the confronting load ball rolling grooves of the slider body and the guide rail via the non-load circulating path of the circulator while the guide rail is moving relative to the slider body in the axial direction. In such miniature linear guide device, recesses for accommodating heads of rail mounting screws for fixing both ends of the guide rail are formed in middle portions of both ends of the slider body.

In the miniature linear guide devices, semiarcuate recesses, each having a radius slightly larger than the head of the rail mounting screw, are formed so that the thickness of each end portion of the circulator is made almost uniform throughout.

The miniature linear guide device according to the first aspect of the present invention is characterized as arranging the guide rail mounting portions on the outer sides of the side surfaces of the guide rail and therefore fixing the guide rail to the base or the like by inserting the screws into such mounting sections. Therefore, even if large-sized screws are used, or even if the mounting screws are set in an intermediate portion in the axial direction of the guide rail, the heads of the screws never interfere with the slider. Hence, by using large-sized screws or by increasing the number of screws as the case may so require, the rail guide fastening force can be increased sufficiently.

The miniature linear guide device according to the first aspect of the present invention is further characterized as arranging the guide rail mounting portions so as to be projected from the outer sides of the side surfaces of the guide rail. Therefore, even in the case where accuracy in the profile of the rolling grooves of the rail is impaired by the screw tightening force applied at the time of fixing the guide rail as in the conventional example, distortions are absorbed only by the projecting mounting sections in the linear guide device of the present invention. Hence, accuracy in the profile of the rolling grooves of the rail is hard to deteriorate at the time of fixing the guide rail.

The miniature linear guide device according to the second aspect of the present invention is characterized as allowing the heads of the guide rail mounting screws to interfere with the end portions of the slider after such heads have almost half entered into the substantially semiarcuate recesses at both end portions of the slider. Therefore, compared with the stroke of the slider in the conventional example in which the end faces of the slider are flat, the stroke of the slider of the present invention can be increased by a value close to the diameter of the head of the guide rail mounting screw. In addition, the thickness of each end portion of the circulator can be made almost uniform throughout, which in turn prevents shrinkage cavity at the time of molding to thereby improve accuracy in molding the curved grooves.

DETAILED DESCRIPTION OF THE PREFERRED EMBODIMENTS

A first embodiment of the present invention will now be described with reference to the accompanying drawings.

Figure 1:
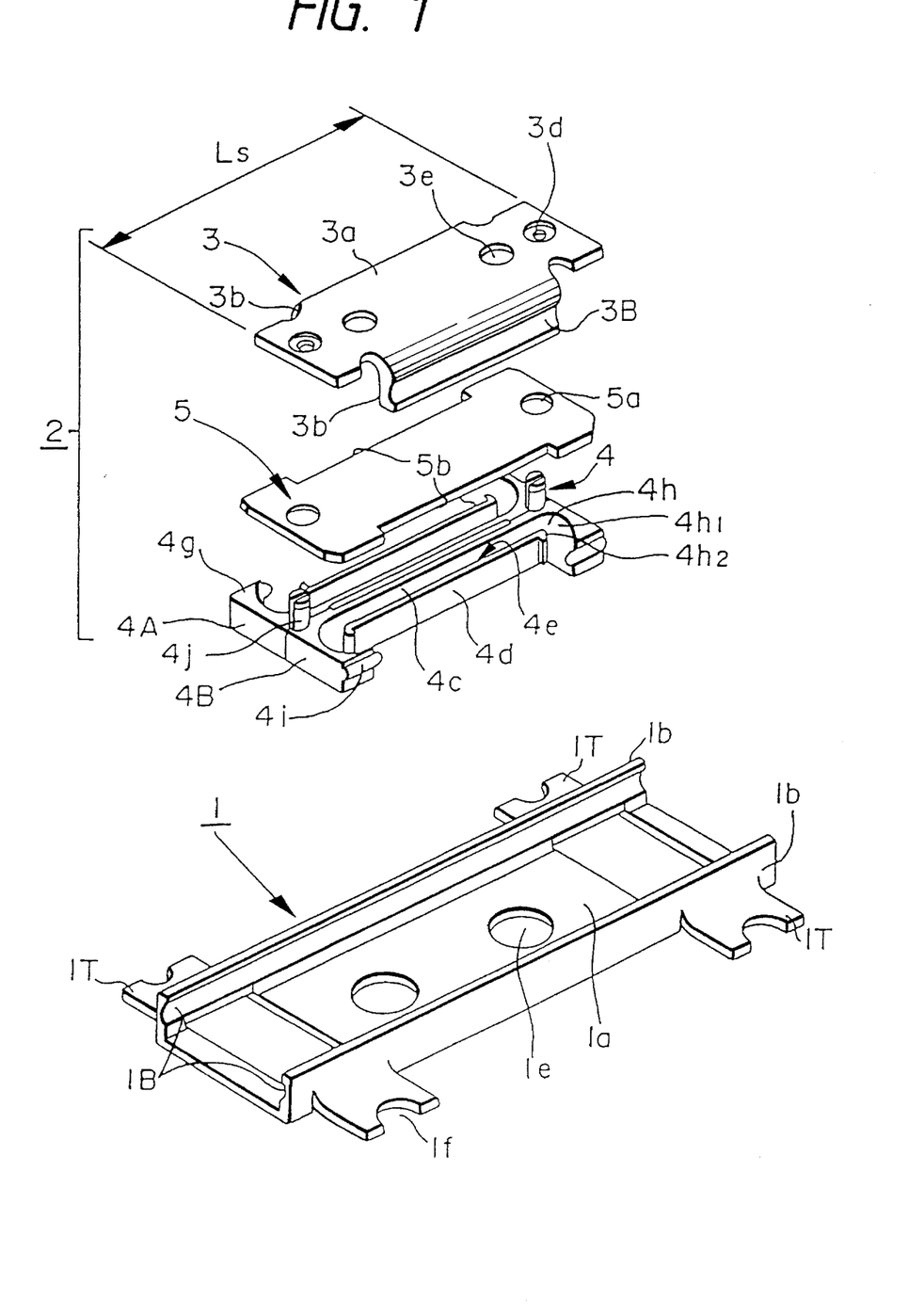
FIG. 1 is an exploded perspective view showing a miniature linear guide device according to a first embodiment of the present invention.
Figure 2:
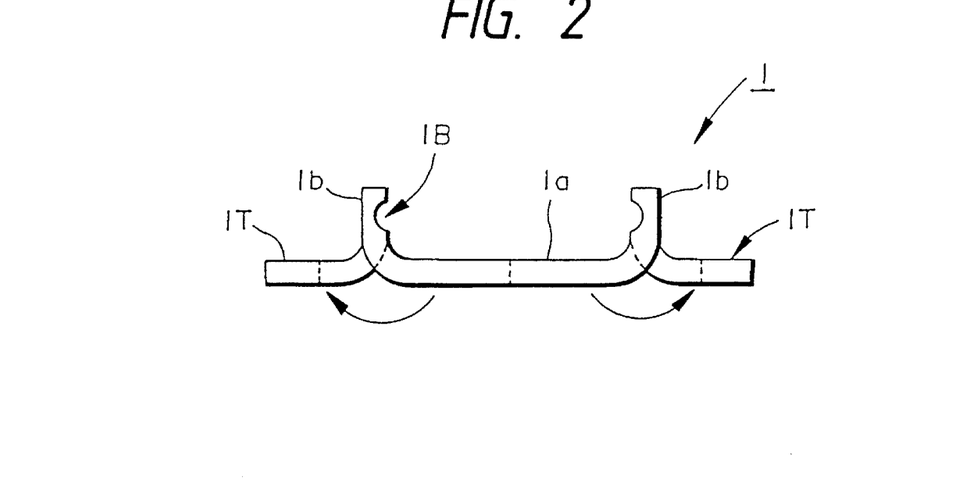
FIG. 2 is a front view of a guide rail in FIG. 1.
Figure 3:
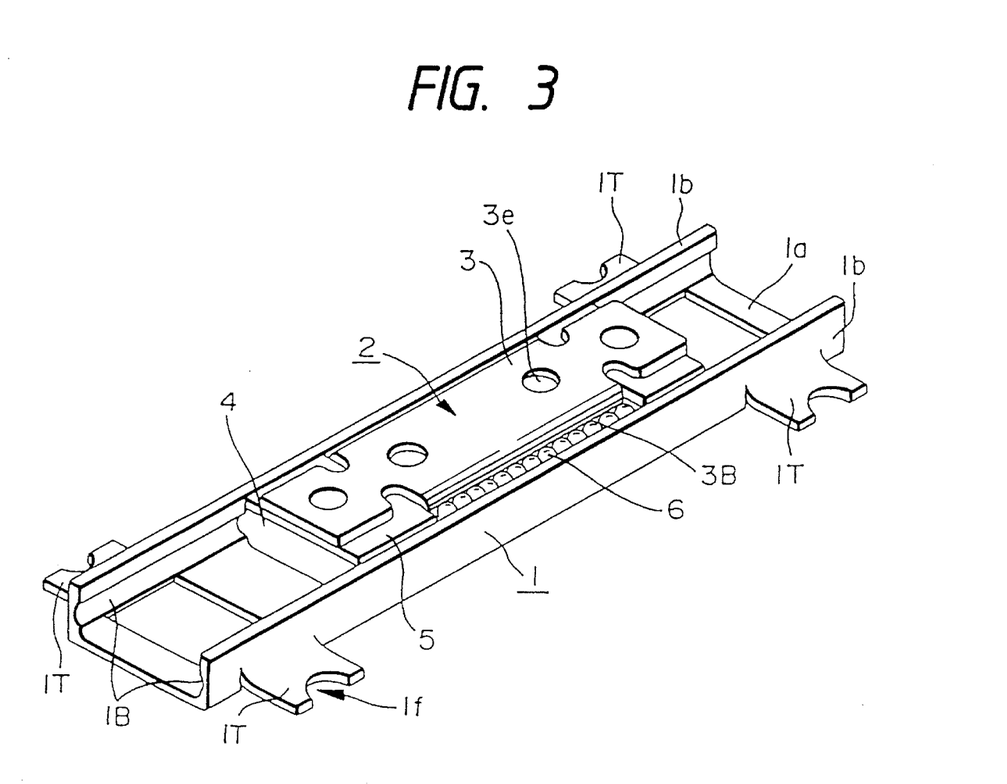
FIG. 3 is a general perspective view of the first embodiment in fabricated form.

FIGS. 1 to 3 show the first embodiment of the present invention. FIG. 1 is an exploded perspective view thereof; FIG. 2 is a front view of a guide rail thereof; and FIG. 3 is a general perspective view thereof in fabricated form. It should be noted that the same or like parts and components as those of the conventional example are designated by the same reference characters.

In FIGS. 1 to 3, a guide rail 1 that guides a slider 2 is formed by press molding a thin steel plate. This guide rail 1 is substantially U-shaped in horizontally cross section with a bottom 1a and side walls 1b, 1b. The side walls 1b, 1b are formed by bending both side edges of the bottom 1a upward and serve as guide surfaces. A single load ball rolling groove 1B is formed on the inner surface of each side wall 1b so as to extend in the axial direction of the guide rail. These load ball rolling grooves 1B, 1B run parallel with each other, and are of the gothic arch (or substantially semicircular) in cross section. The bottom 1a has rail mounting portions 1T and accuracy measuring holes 1e, the rail mounting portions serving to mount the guide rail 1 on a member such as a base to use the miniature linear guide device.

Each rail mounting portion 1T is formed by cutting portions of the bottom 1a of the guide rail out into a full bottom width (as far as to the bottom of each side wall 1b) and further cutting each such cut portion in the middle, and then bending the thus cut portions outward from the side walls 1b, 1b (both to the right and to the left) so as to open them apart outward so that the bent cut portions are substantially level with the bottom 1a of the rail. Each of the thus formed rail mounting portions 1T on both right and left sides has a substantially semicircular mounting recess If formed therein (a circular screw hole may also be acceptable). Where the rail mounting portions 1T are positioned may be selected arbitrarily. Although the respective rail mounting portions 1T are preferably positioned close to both ends in the axial direction of the guide rail 1, they may also be positioned in the intermediate portion of the guide rail 1 as the case may so require.

The slider 2 includes: a slider body 3, a circulator 4, and a cap 5. The slider body 3 is made of a thin steel plate and has a total length $L_s$. The circulator 4 is made of a synthetic resin and has substantially the same length as the slider body 3. The cap 5 is made of a synthetic resin.

The slider body 3 has an outer width that is slightly narrower than the inner width of each side wall 1b of the guide rail 1. The slider body 3 is inverse-U-shaped in horizontally cross section by a top 3a and side walls 3b, 3b that are formed by bending both side edges of the top 3a downward, and is interposed between both side walls 1b, 1b of the guide rail 1. Axially extending load ball rolling grooves 3B are formed on the outer side surfaces of the side walls 3bso as to confront the load ball rolling grooves 1B of the guide rail 1, respectively. The load ball rolling grooves 3B are of the gothic arch (or substantially semicircular) in cross section similarly to those of the guide rail 1.

Fixing spot facing holes 3d for engaging the slider body with the circulator 3 are formed at positions closer to both end portions in the axial direction of the top 3a of the slider body. On the inner sides of the respective fixing spot facing holes are mounting screw holes 3e that allow the slider 2 to be mounted on other member such as a table.

The circulator 4 is formed by integrally uniting two symmetrical members 4A, 4B with each other, the two members being formed by injection molding. FIG. 1 shows the circulator in united form. A barrel of the circulator 4 having axially extending non-load ball circulating grooves 4e, 4e between a wall surface 4c in the middle and wall surfaces 4d erected on both left and right sides of the wall surface 4c. The barrel of the circulator, which is thus E-shaped in cross section, is fitted between both side walls 3b, 3b of the slider body 3. Flanges 4g jut out into the left and right sides from both end portions in the axial direction of the barrel. Each flange 4g has a semiarcuate curved groove 4h so as to communicate with the corresponding non-load ball circulating groove 4e. The non-load ball circulating grooves 4e, 4e and the semiarcuate curved grooves 4h, 4h on both ends constitute a non-load ball circulating path. It should be noted that inner arcuate surfaces $4h_2$ are formed at both end portions in the axial direction of the wall surfaces 4d, 4d so as to correspond to outer arcuate surfaces $4h_1$ of the semiarcuate curved grooves 4h, 4h, so that balls can be guided smoothly. A ball scooping projection 4i is formed on a side end portion of each flange 4g, which is an open end of each curved groove 4h (this end communicating with the load ball rolling groove 1B of the guide rail 1). The ball scooping projections 4i are formed so as to be engageable with the load ball rolling grooves 1B, so that the balls can circulate smoothly during the operation of the linear guide device. On top of each flange 4g of the circulator 4 is a cylindrical engagement projection 4j (a semi-cylindrical engagement projection on the member 4A is integrally united with that on the member 4B to form the cylindrical engagement projection 4j).

The cap 5 holds the two members 4A, 4B of the circulator 4 with the two members integrally united. The cap 5 has not only through holes 5a, into which the cylindrical engagement projections 4j of the flanges of the circulator 4 are inserted, on both end portions in the axial direction thereof, but also notches 5b at both left and right edges thereof so as to be loosely fitted with both side walls 3b, 3b of the slider body 3.

The slider 2 is fabricated in the following manner.

The cylindrical engagement projections 4j of the circulator 4 formed by setting the two symmetrical members 4A, 4B end-to-end are inserted into the through holes 5a of the cap 5, respectively, and the cap 5 is fitted over the circulator 4. Then, the slider body 3 is placed thereover, and the engagement projections 4j of the circulator 4 are further inserted into the fixing spot facing holes 3d, respectively.

The slider 2 is fabricated by integrally fixing the slider body 3 and the circulator 4 while interposing the cap 5 therebetween with the heads of the engagement projections 4j projecting from the top of the slider body 3 welded with pressure. As a result of this process, not only the non-load ball circulating grooves 4e of the circulator 4 and the curved grooves 4h are covered with the cap 5, but also the inner arcuate surfaces $4h_2$ on the open ends of the curved grooves 4h are smoothly connected to the load ball rolling grooves 3B of the slider body 3, thereby constituting the non-load ball circulating path.

The thus fabricated slider 2 is loosely fitted into the recess of the guide rail 1, and a plurality of balls 6 are loaded in the non-load ball circulating path, the load ball rolling grooves 1B of the guide rail 1, and the load ball rolling grooves 3B of the slider 2 corresponding to the grooves 1B.

The outer arcuate surfaces $4h_1$ on the open ends of the curved grooves 4h are connected to the load ball rolling grooves 1B of the guide rail 1 so as to be close to the bottoms of the grooves 1B through the ball scooping projections 4i projecting from the side end portions of the flanges 4g of the circulator 4. Therefore, the balls 6 can circulate smoothly.

The operation of the aforementioned embodiment will be described next.

The guide rail 1 is fixed to a base (not shown) by inserting screws $B_1$ into the mounting recesses 1f of the rail mounting portions 1T projecting outward from both side walls 1b, 1b. Since the screws $B_1$ are positioned outside the guide rail 1, the heads of larger screws $B_1$, even if used as necessary, in no way interfere with the slider 2. Further, in addition to the rail mounting portions 1T arranged close to both ends, rail mounting portions 1T may be provided in an intermediate portion so that the number of screws $B_1$ can be increased. As described above, the present invention allows the size and number of the guide rail mounting screws to be increased with ease, which in turn contributes to increasing the force for fastening the guide rail 1 to the base or the like and hence allows the guide rail to be fixed securely under operating conditions in which vibration and impact are applied.

Moreover, Since the mounting portions of the guide rail are arranged so as to be projected outside the side surfaces of the rail, distortions can be absorbed only by the projected mounting portions even if accuracy in the profile of the rolling grooves of the rail is impaired by the screw tightening force at the time of fixing the guide rail as in the conventional example. As a result, accuracy in the profile of the ball rolling grooves is less deteriorated at the time of fixing the guide rail in the embodiment of the present invention.

On the other hand, the slider 2 is mounted on a not shown table by inserting screws into the mounting screw holes 3e formed in the top 3a of the slider body 3.

If the table is driven, the slider 2 moves along the length of the guide rail 1. The balls 6 interposed between the load ball rolling grooves 1B of the guide rail 1 and the load ball rolling grooves 3B of the slider body 3 are rolling in association with the movement of the slider 2 and, at the same time, move in the same direction as the slider 2 within the load ball rolling grooves 1B, 3B at a speed lower than the moving speed of the slider 2. When each of the balls 6 reaches the respective flange 4g, it is scooped up into the curved groove 4h by the ball scooping protrusion 4i extended from the flange 4g, where it is U-turned. The ball 6 thus U-turned is moved along the non-load ball circulating groove 4e to the opposite curved groove 4h, where it is U-turned again into the aforementioned space defined by the load ball rolling grooves 1B and 3B. Thus, the balls 6 are repeatedly circulated in the above-described manner.

According to the miniature linear guide device, which is the first embodiment of the present invention, even if a force such as vibration of the table or impact attributable to the table making an abrupt stop is transmitted to the guide rail 1 while the slider 2 is travelling, the guide rail 1 does not flex since the guide rail 1 is fixed with the large fastening force through the rail mounting portions 1T projected outside the side surfaces of the guide rail. Therefore, the miniature linear guide device of the present invention can be applied to such tables as being specified as pneumatically operated equipment which is susceptible to impact and to which it is, therefore, considered not applicable. Hence, high guiding accuracy as well as stop position accuracy can be ensured. In addition, the rail mounting portions 1T can be formed by cutting portions of the bottom 1a of the guide rail 1, further cutting each cut portion in the middle, and bending the thus cut portions outward in the width direction so as to open the cut portions apart. Therefore, these portions 1T can be formed simultaneously during the guide rail 1 press molding process, which provides an advantage that the guide rail 1 can be made inexpensively without increasing the number of process steps.

While an example of a miniature linear guide device having no seal member has been described in the aforementioned embodiment, the present invention is applicable to a miniature linear guide device having a seal member.

A second embodiment of the present invention will be described next with reference to the accompanying drawings.

Figure 4:
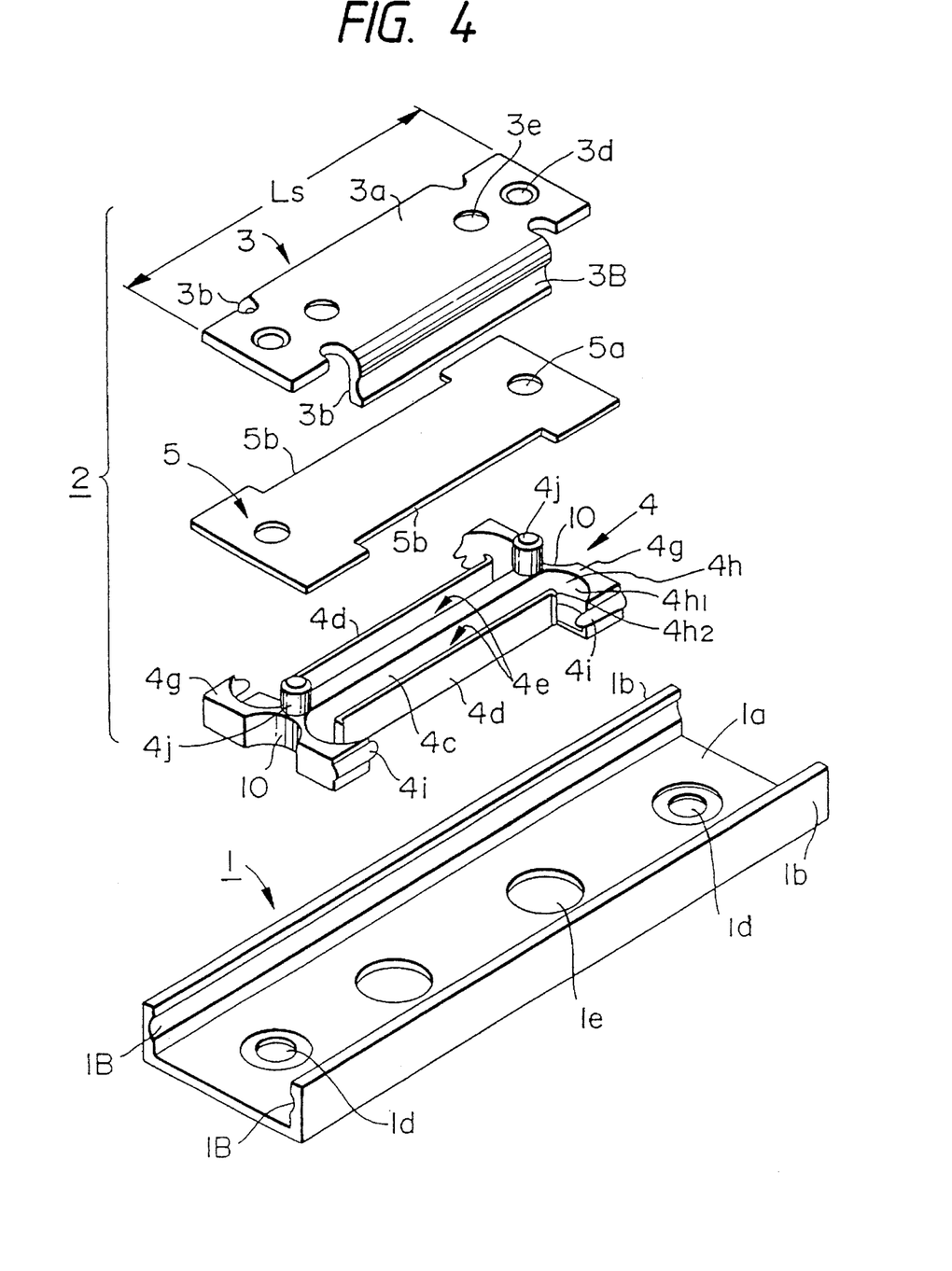
FIG. 4 is an exploded perspective view showing a miniature linear guide device according to a second embodiment of the present invention.
Figure 5:
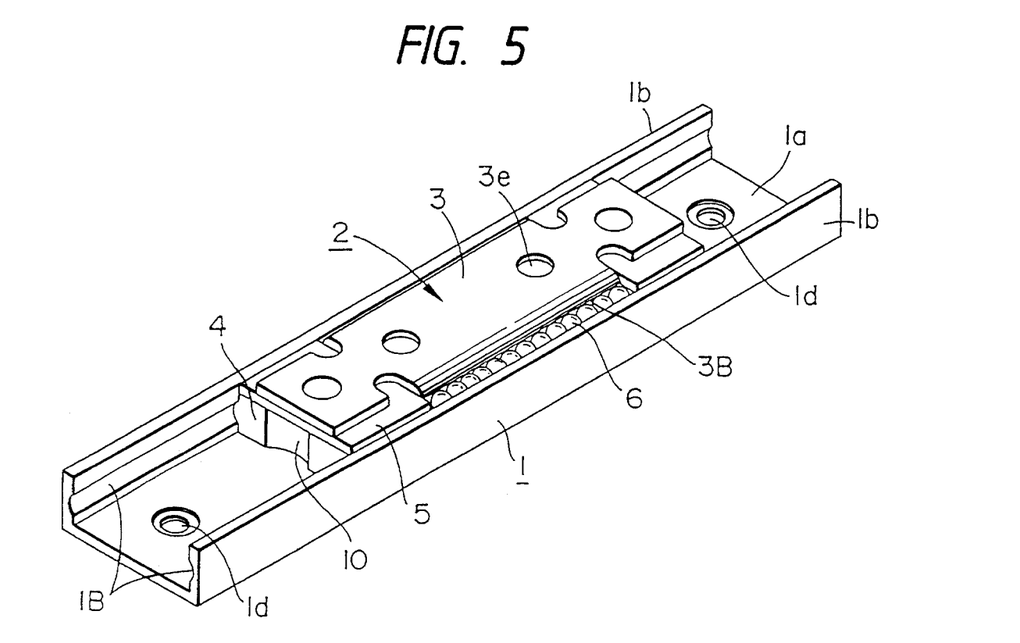
FIG. 5 is a general perspective view of the second embodiment in fabricated form.
Figure 6:
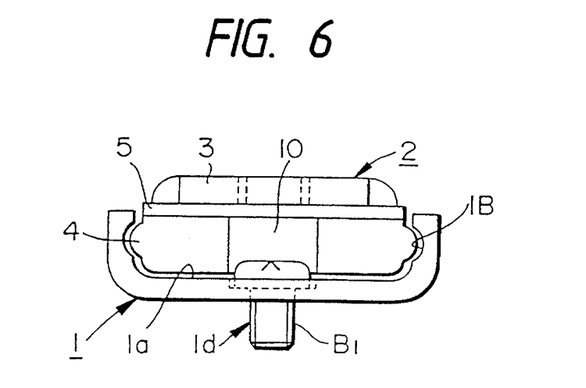
FIG. 6 is a front view of the miniature linear guide device in FIG. 5.
Figure 7:
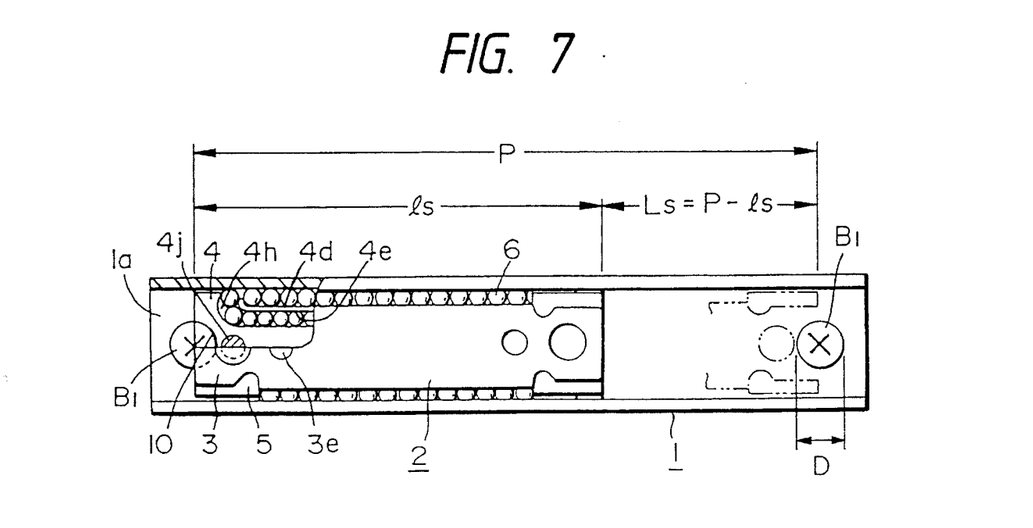
FIG. 7 is a plan view of the miniature linear guide device in FIG. 5.

FIGS. 4 to 7 show the second embodiment of the present invention. FIG. 4 is an exploded perspective view thereof; FIG. 5 is a general perspective view thereof in fabricated form; FIG. 6 is a front view thereof; and FIG. 7 is a partially cutaway plan view thereof. It should be noted that the same or like parts and components as those of the conventional example are designated by the same reference characters. Further, it is omitted from explaining the same or like parts and components as those of the first embodiment.

In FIGS. 4 to 7, rail mounting screw insertion holes 1d for mounting the guide rail 1 to a member such as a base are provided close to both ends and accuracy measuring holes 1e are provided in an intermediate portion of the bottom 1a. The circulator 4 is integrally formed by injection molding as shown in FIG. 4. The circulator 4 may be formed by uniting two symmetrical members 4A, 4B with each other, the two members being formed by injection molding, as described in the first embodiment.

Further, in the case of the second embodiment, substantially semiarcuate recesses 10 are formed in the middle of the end faces of the flanges 4g of the circulator 4, respectively. Each recess 10 is formed so as to keep away from the curved grooves 4h and the engagement projection 4j, and is of the size matching the size of the head of the rail mounting screw $B_l$ for fixing the guide rail 1.

In this case, since the recesses 10 are formed at the end portions of the circulator 4 so that the thickness of each end portion of the circulator 4 is made almost uniform throughout, the arrangement of the recesses 10 on both end portions of the circulator 4 contributes to reducing shrinkage cavity at the time of molding the curved grooves 4h, thereby not only improving accuracy in the profile of the curved groove portions, but also saving the molding material used so that the number of circulators molded can be increased using the same quantity of material.

The cap 5 has not only through holes 5a, into which the cylindrical engagement projections 4j of the flanges of the circulator 4 are inserted, on both ends in the axial direction thereof, but also notches 5b at both left and right edges thereof so as to be loosely fitted with both side walls 3b, 3b of the slider body 3 (if the circulator 4 is formed of two members, the cap 5 holds both members while integrally uniting such members).

The operation of the aforementioned second embodiment will be described next.

The guide rail 1 is fixed to a not shown base by inserting screws $B_1$ into the rail mounting holes 1d arranged in the bottom 1a close to both end portions thereof. On the other hand, the slider 2 is mounted on a not shown table by inserting screws into the mounting screw holes 3e formed in the top 3a of the slider body 3.

If the table is driven, the slider 2 moves along the length of the guide rail 1. The balls 6 interposed between the load ball rolling grooves 1B of the guide rail 1 and the load ball rolling grooves 3B of the slider body 3 are rolling in association with the movement of the slider 2 and, at the same time, move in the same direction as the slider 2 within the load ball rolling grooves 1B, 3B at a speed lower than the moving speed of the slider 2. As the balls 6 reach the flanges 4g on one end of the circulator 4, the balls 6 are scooped by the ball scooping projections 4i, enter into the curved grooves 4h, make a U-turn along the grooves and pass the non-load ball circulating grooves 4e, make another U-turn at the curved grooves 4h on the other end, and return to the load ball rolling grooves 1B of the guide rail 1 and the load ball rolling grooves 3B of the slider body 3. This circulation process of the balls is repeated.

Thus, the slider 2 can travel to a position at which the heads of the rail mounting screws $B_1$ on the end portions of the guide rail 1 are allowed to enter into the recesses 10 at the end portions of the slider 2 (FIG. 7). Therefore, the effective stroke $L_s$ of the slider 2 in this case is equal to a difference between the pitch P of the mounting screws $B_1$ on both ends of the rail and the total length $l_s$ of the slider 2, i.e., $(P-l_s)$. The effective stroke $L_s$ is longer than the effective stroke $(L-l_s)$ of the slider in the conventional miniature linear guide device of the same size by the diameter D of the head of the screw $B_1$ (see FIG. 10).

Accordingly, the second embodiment is extremely advantageous in obtaining a longer effective stroke than that of the conventional example with the lengths of the guide rail 1 and the slider 2 being the same as those of the conventional example.

While an example in which the recess 10 is as high as the circulator 4 has been described in the second embodiment, the present invention is not limited thereto; the recess 10 may be formed so as to be as high as to allow the head of the rail mounting screw $B_1$ to be accommodated therein.

Further, while the recess 10 is semiarcuate in the second embodiment, a substantially semiarcuate recess may also be acceptable. The recess 10 may be a square notch.

Still further, an example of a miniature linear guide device having no seal member has been described in the second embodiment. If the miniature linear guide device has a seal member, the recess 10 may be provided on end faces of the seal member.

As described in the foregoing, the first embodiment of the present invention is applied to a miniature linear guide device that includes: an axially extending guide rail having a substantially U-shaped in cross section and having axially extending load ball rolling grooves on inner surfaces of side walls thereof, the side walls confronting each other; a slider body having a substantially inverted U-shape in cross section, being fitted between the inner surfaces of the side walls of the guide rail, and having load ball rolling grooves on outer surfaces of side walls thereof, the load ball rolling grooves confronting the load ball rolling groove of the guide rail, respectively; a circulator being fitted into recessed portions of the slider body and having an axially extending non-load ball circulating path therein; and a plurality of balls circulating by rolling in the load ball rolling grooves of the slider body and the guide rail via the non-load circulating path of the circulator. In such miniature linear guide device, rail mounting portions are formed by cutting portions of the guide rail and bending the cut portions outward in a width direction so as to be opened apart outward from the side walls.

As a result of this construction, the rail fastening force can be increased with ease by increasing the size and number of rail mounting screws without interference with the slider. Hence, a miniature linear guide device that not only can ensure stable travelling of the slider over a long period of time under conditions in which vibration and impact are applied, but also is less susceptible to inaccuracy in the profile of the load ball rolling grooves of the guide rail at the time of fixing the guide rail can be provided inexpensively.

Further, the second embodiment of the present invention is applied to a miniature linear guide device that includes: a axially extending guide rail having a substantially U-shaped in cross section and having axially extending load ball rolling grooves on inner surfaces of side walls thereof, the side walls confronting each other; a slider having load ball rolling grooves on outer surfaces of side walls thereof, the load ball rolling grooves confronting the load ball rolling grooves of the guide rail, respectively, and being fitted between the inner surfaces of the side walls of the guide rail with a circulator attached thereinto, the circulator having an axially extending non-load ball circulating path; and a plurality of balls circulating by rolling in the confronting load ball rolling grooves of the slider and the guide rail via the non-load circulating path of the circulator while the guide rail is moving relative to the slider in the axial direction. In such miniature linear guide device, recesses for accommodating heads of rail mounting screws for fixing both ends of the guide rail are formed in middle portions of both ends of the slider. In the miniature linear guide devices, semiarcuate recesses, each having a radius slightly larger than the head of the rail mounting screw, are formed so that the thickness of each end portion of the circulator is made almost uniform throughout.

As a result of this construction, the position at which the guide rail mounting screws interfere with the slider can be shifted toward the end portions of the guide rail, which in turn allows the height of the linear guide device itself to be low as well as allows only the stroke to be increased without changing the lengths of the guide rail and the slider. In addition, since the recesses are formed at the end portions of the circulator so that the thickness of each end portion of the circulator is made almost uniform throughout, accuracy in molding the circulator is improved, which in turn allows the balls to circulate smoothly and therefore contributes to providing a miniature linear guide device with good performance. The arrangement of the recesses at the end portions of the circulator allows the quantity of molding material used to be reduced. Although such saving is small on a single circulator basis, the present invention contributes to a substantial reduction in the cost of manufacture since circulators are injection molded on a mass production basis.

What is claimed is:

1. A miniature linear guide device comprising:

a guide rail substantially U-shaped in section which is extended in a longitudinal direction of the device, the guide rail including a first load ball rolling groove formed on an inner surface of a side wall of the guide rail and extended in the longitudinal direction, and including a rail mounting portion formed by cutting a portion of a bottom of the guide rail and bending the portion outward in a width direction so as to be opened apart outward from the side wall;

a slider body substantially U-shaped in section which is adapted to be fitted in the side wall of the guide rail, the slider body including a second load ball rolling groove formed on an outer surface of a side wall of the slider body and confronted with the first load ball rolling groove of the guide rail;

a circulator fitted in a concave portion of the slider body, and including a non-load ball circulating path extended in the longitudinal direction; and a plurality of balls fitted to roll in a space defined by the first and second load ball rolling grooves and the non-load ball circulating path of the circulator.

2. The miniature linear guide device of claim 1, wherein the rail mounting portion includes a mounting recess formed therein.

3. The miniature linear guide device of claim 1, wherein the rail mounting portion is positioned close to an end of the guide rail in the longitudinal direction.

4. A miniature linear guide device fixed by a rail mounting screw on a base, comprising:

a guide rail substantially U-shaped in section which is extended in a longitudinal direction of the device, the guide rail including a first load ball rolling groove formed on an inner surface of a side wall of the guide rail and extended in the longitudinal direction;

a slider body substantially U-shaped in section which is adapted to be fitted in the side wall of the guide rail, the slider body including a second load ball rolling groove formed on an outer surface of a side wall of the slider body and confronted with the first load ball rolling groove of the guide rail;

a circulator fitted in a concave portion of the slider body, and including a non-load ball circulating path extended in the longitudinal direction and a recess formed in a middle portion of a longitudinal end of the circular for accommodating a head of the rail mounting screw fixing an end of the guide rail to the base; and a plurality of balls fitted to roll in a space defined by the first and second load ball rolling grooves and the non-load ball circulating path of the circulator.

5. The miniature linear guide device of claim 4 wherein the recess is formed in a semiarcuate shape having a radius slightly larger than the head of the rail mounting screw.

6. The miniature linear guide device of claim 4, wherein the slider body slides on the guide rail to a position where the head of the rail mounting screw is entered into the recess.

7. The miniature linear guide device of claim 4, wherein the recess is so formed that the thickness of the longitudinal end of the circulator is made substantially uniform throughout.

* * * * *